(12) United States Patent
Jeong et al.

(10) Patent No.: US 10,650,125 B2
(45) Date of Patent: May 12, 2020

(54) ELECTRONIC APPARATUS AND CONTROL METHOD THEREOF

(71) Applicant: SAMSUNG ELECTRONICS CO., LTD., Suwon-si, Gyeonggi-do (KR)

(72) Inventors: Dong-hwa Jeong, Suwon-si (KR); Sung-kyu Lee, Suwon-si (KR); Hyun-cheol Park, Yongin-si (KR); Chang-woo Lee, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/446,417

(22) Filed: Mar. 1, 2017

(65) Prior Publication Data

US 2017/0262620 A1    Sep. 14, 2017

(30) Foreign Application Priority Data

Mar. 11, 2016    (KR) .................. 10-2016-0029712

(51) Int. Cl.
*G06F 21/12*    (2013.01)
*G06F 21/44*    (2013.01)
(Continued)

(52) U.S. Cl.
CPC ........ *G06F 21/121* (2013.01); *G06F 9/45533* (2013.01); *G06F 9/4818* (2013.01);
(Continued)

(58) Field of Classification Search
CPC .. G06F 9/45533; G06F 9/4818; G06F 9/4843; G06F 9/4881; G06F 12/1458;
(Continued)

(56) References Cited

U.S. PATENT DOCUMENTS 8,666,723 B2 * 3/2014 Xie .................. G06F 9/455
703/13
9,378,041 B2 * 6/2016 Raskar ............... G06F 9/45558
(Continued)

FOREIGN PATENT DOCUMENTS

KR    10-2014-0027622    3/2014

OTHER PUBLICATIONS

Extended Search Report dated Jul. 12, 2017 in counterpart EuropeanPatent Application No. 17160421.8.
(Continued)

*Primary Examiner* — Mohammad A Siddiqi
(74) *Attorney, Agent, or Firm* — Nixon & Vanderhye P.C.

(57) ABSTRACT

An electronic apparatus operated based on an OS is provided. The electronic apparatus includes a storage to store the OS, a virtual device program capable of generating a virtual device executed based on the OS, and at least one program; and at least one processor to execute the virtual device program to generate the virtual device, and to execute the OS to determine whether a first program having an administration authority assigned by the OS from among the at least one program has access authority to data about the virtual device in response to an attempt to access the data from the first program and to selectively permit the access to the data based on the determined access authority. With this, the electronic apparatus may restrain the access to the virtual device or the data thereabout according to a presence of the access authority, thereby safely protecting the virtual device or the data.

14 Claims, 13 Drawing Sheets

(51) Int. Cl.
*G06F 21/70* (2013.01)
*G06F 9/48* (2006.01)
*G06F 9/455* (2018.01)
*G06F 12/14* (2006.01)

(52) U.S. Cl.
CPC .......... *G06F 9/4843* (2013.01); *G06F 9/4881* (2013.01); *G06F 12/1458* (2013.01); *G06F 21/44* (2013.01); *G06F 21/70* (2013.01); *G06F 2221/0735* (2013.01)

(58) Field of Classification Search
CPC ........ G06F 21/121; G06F 21/44; G06F 21/70; G06F 2221/0735
See application file for complete search history.

(56) References Cited

U.S. PATENT DOCUMENTS

| | | | | |
|---|---|---|---|---|
| 9,921,884 | B1* | 3/2018 | McInerny | G06F 9/5077 |
| 2005/0034125 | A1* | 2/2005 | Guy | G06F 3/0622 |
| | | | | 718/100 |
| 2007/0168454 | A1* | 7/2007 | Ben-Yehuda | H04L 63/20 |
| | | | | 709/213 |
| 2007/0288623 | A1* | 12/2007 | Kato | G06F 21/33 |
| | | | | 709/223 |
| 2014/0020086 | A1* | 1/2014 | Tanikawa | G06F 21/31 |
| | | | | 726/17 |
| 2014/0059160 | A1* | 2/2014 | Chernoff | H04L 49/70 |
| | | | | 709/217 |
| 2014/0075420 | A1* | 3/2014 | Queru | G06F 9/4411 |
| | | | | 717/134 |
| 2015/0019864 | A1 | 1/2015 | Pate | |
| 2015/0212703 | A1* | 7/2015 | Luckett, Jr. | G09G 5/377 |
| | | | | 345/158 |
| 2015/0220354 | A1* | 8/2015 | Nair | G06F 13/28 |
| | | | | 710/301 |
| 2015/0347178 | A1 | 12/2015 | Magee et al. | |
| 2017/0308386 | A1* | 10/2017 | Devitt-Carolan | G06F 9/4416 |

OTHER PUBLICATIONS

Communication pursuant to Article 94(3) EPC dated Feb. 6, 2018 in counterpart European Patent Application No. 17160421.8.
EP Office Action for EP Application No. 17160421.8 dated Nov. 8, 2018.

* cited by examiner

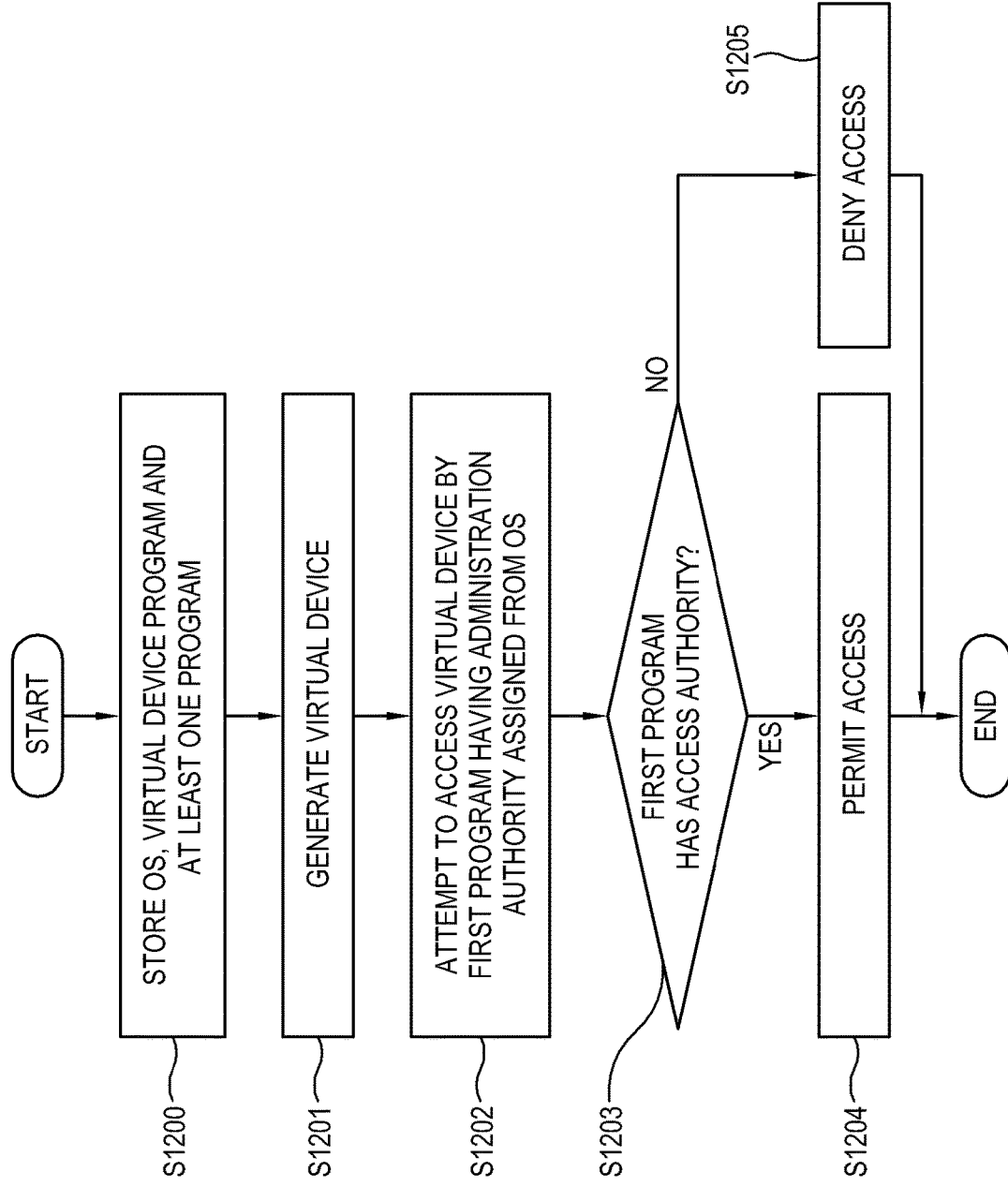

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2016-0029712, filed on Mar. 11, 2016 in the Korean Intellectual Property Office, the disclosure of which is incorporated by reference herein in its entirety.

BACKGROUND

Field

The present disclosure relates generally to protection of a generated virtual device or data related thereto, and for example to an electronic apparatus and a control method thereof, which even if a program with an administration authority assigned from an operating system (OS) attempts to access a generated virtual device or data related thereto, checks an authentication code assigned to the program from a manufacturer or supplier of the electronic apparatus in program building, to permit or deny the access, thereby protecting the generated virtual device from an external hacking attack or the like.

Description of Related Art

A virtual device is not generated physically, but logically in an electronic apparatus, and means a virtualization environment to seem that independent programs are executed. The virtual device is a technology of way, which intactly shares an OS and general program files existing in the electronic apparatus and which redirects only results from programs executed in the virtual device or actions thereof into zones of virtualization.

The virtual device may be established as a virtual driver or system, such as a virtual compact disc read-only memory (CD-ROM), a virtual desktop computer, and so on, to perform independent operations at a personal computer (PC) or the like, and configured to enable performed results not to have an effect on a main or regular system.

The virtual device may be implemented by a hypervisor structure, which is executed based on a virtual OS different from the OS of the regular system, and a container structure, which uses the OS of the regular system. The container structure has advantages in that there is no need to store or implement additional data in order to implement a separate OS and that since emulating of hardware is not inevitable, a processor occupancy ratio is smaller, as compared to that of the hypervisor structure.

Since it is impossible for programs operated in the virtual device according to related art to access other virtual devices or the regular system, the whole system is not exposed to dangers even if the virtual device is subjected to an external hacking attack or the like. However, in the related art, if the regular system assigns an administration authority to an external hacker or the like due to the external hacking attack, there is a problem in that since there are no restrictions on an access to the virtual device, which is already generated and in operation, there is no method, which can protect data generated based on operations of the virtual device and programs running in the virtual device or other electronic apparatuses connected with the virtual device.

SUMMARY

Example embodiments of the present disclosure address at least the above problems and/or disadvantages and other disadvantages not described above.

The example embodiments may provide an electronic apparatus in which, if an access attempt to data about a virtual device from a program to which an administration authority is assigned from an OS is detected, checks an access authority of the program to selectively deny or permit the access.

According to an example aspect of an example embodiment, an electronic apparatus operated based on an OS is provided, including: a storage configured to store the OS, a virtual device program capable of generating a virtual device which is executed based on the OS, and at least one program; and at least one processor configured to execute the virtual device program to generate the virtual device, and to execute the OS to determine whether a first program having an administration authority assigned by the OS from among the at least one program has access authority to data about the virtual device in response to an attempt to access the data about the virtual device from the first program and to selectively permit the access to the data about the virtual device based on the determined access authority of the first program.

The data about the virtual device may include at least one of the virtual device program, a second program executed at the virtual device from among the at least one program, a directory in which the virtual device program or the second program is located, and whole process information of the electronic apparatus.

The OS may be configured to determine the access authority of the first program to the data about the virtual device based on an authentication code included in the first program.

The authentication code may be included in building of the first program.

The at least one processor may be configured to monitor whether the OS is altered, and if it is determined that the OS has been altered, perform at least one of denying all accesses to the data about the virtual device, stopping the generated virtual device, and initializing the generated virtual device.

The at least one processor may be configured to determine whether drivers included in the OS have been authenticated to block unauthenticated drivers from being loaded.

The at least one processor may be configured to execute the virtual device program to generate a plurality of virtual devices, and to selectively permit an access of at least one virtual device from among the plurality of virtual devices based on the determined access authority of the first program.

According to an example aspect of another example embodiment, method of operating an electronic apparatus is provided, including: storing an OS, a virtual device program capable of generating a virtual device which is executed based on the OS, and at least one program; executing the virtual device program to generate the virtual device; and executing the OS to determine whether a first program having an administration authority assigned by the OS from among the at least one program has access authority to data about the virtual device in response to an attempt to access the data about the virtual device from the first program and to selectively permit the access to the data about the virtual device based on the determined access authority of the first program.

The data about the virtual device may include at least one of the virtual device program, a second program executed at the virtual device from among the at least one program, a directory in which the virtual device program or the second program is located, and whole process information of the electronic apparatus.

The determining may include determining the access authority of the first program to the data about the virtual device based on an authentication code included in the first program.

The authentication code may be included in building of the first program.

The method may further include monitoring whether the OS is altered, and if it is determined that the OS has been altered, performing at least one of denying all accesses to the data about the virtual device, stopping the generated virtual device, and initializing the generated virtual device.

The method may further include determining whether drivers included in the OS have been authenticated, and blocking unauthenticated drivers from being loaded.

The method may further include generating a plurality of virtual devices, and selectively permitting an access of at least one virtual device from among the plurality of virtual devices based on the determined access authority of the first program.

As described above, according to the example embodiments, even if a main or regular system is taken over by an external hacking attack or the like, the electronic apparatus may deny or block the access to the virtual device, which is already generated and in operation, thereby improving security.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIG. 13 is a flowchart illustrating an example control method of an electronic apparatus according to an example embodiment.

Throughout the drawings, like reference numerals will be understood to refer to like parts, components, and structures.

DETAILED DESCRIPTION

Figure 1:
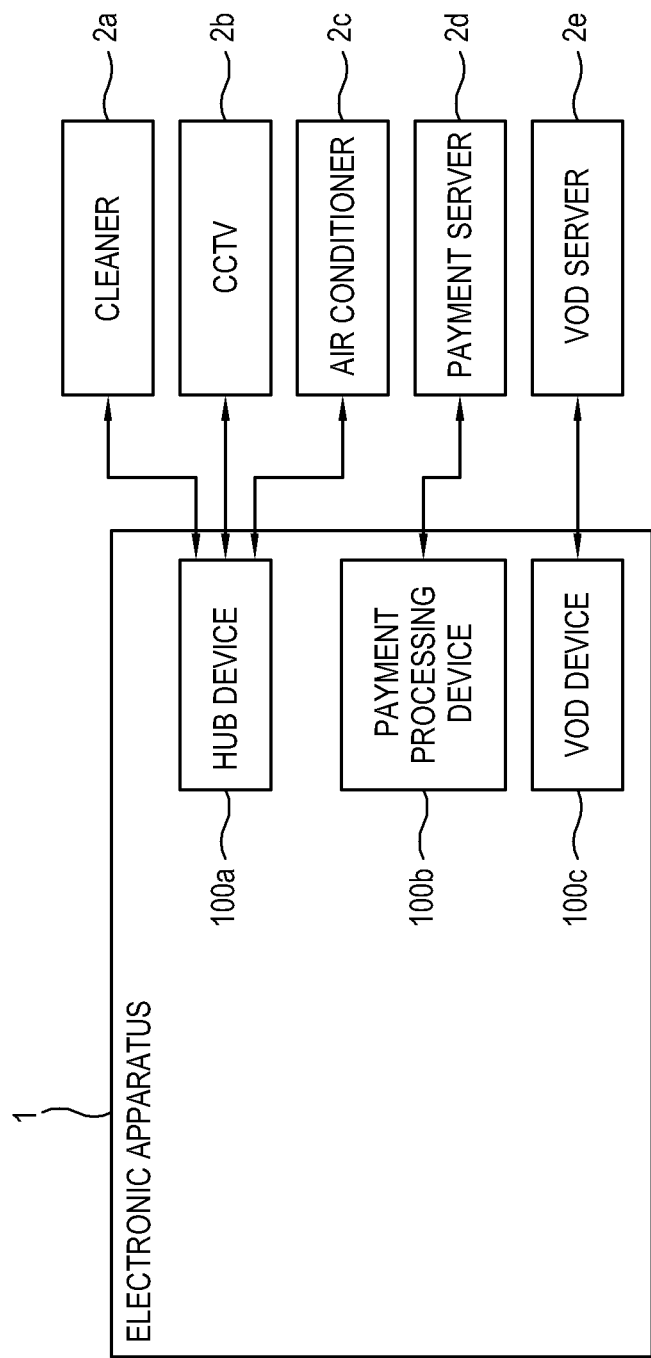
FIG. 1 is a diagram illustrating an example of using an electronic apparatus and a virtual device according to an example embodiment.

The following description is made with reference to the accompanying drawings and is provided to assist in a comprehensive understanding of various example embodiments as defined by the claims and their equivalents. It includes various specific details to assist in that understanding but these are to be regarded as merely example. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the example embodiments. Accordingly, it should be apparent to those skilled in the art that the following description of various example embodiments is provided for illustration purpose only and not for the purpose of limiting the example embodiments as defined by the appended claims and their equivalents.

Some of the elements shown in accompanying drawings have been exaggerated, omitted or briefly illustrated, and the size of each element does not wholly reflect the actual size. The present disclosure is not limited by the relative size or interval shown in accompanying drawings.

If an element is described as "including" another element throughout this specification, it means the former may further include the latter rather than excluding other elements unless otherwise specifically provided herein. The term "portion" used in this specification may refer, for example, to software field-programmable gate array (PFGA) or hardware such as, for example, and without limitation, a dedicated processor, a CPU, an application-specific integrated circuit (ASIC), or the like, and may be configured to perform certain roles. However, the term "portion" is not limited to the software or hardware, and may be configured to be in an addressable storage medium, or may be configured to reproduce one or more processors. Thus, as an example, the term "portion" includes elements such as software elements, object-oriented software elements, class elements and task elements, and processes, functions, features, procedures, sub-routines, segments of program codes, drivers, firmware, micro codes, circuits, data, database, data configurations, tables, arrays and variables. The functionality provided in the elements and or portions may be coupled to a smaller number of elements and parts or further divided into additional elements and portions.

With reference to accompanying drawings, example embodiments will be described in detail for those skilled in the art to understand the present disclosure without difficulty. The example embodiments may be achieved in various forms, and are not limited to the embodiments provided herein. To clearly describe the example embodiments, those unrelated to the description have been omitted, and like reference numerals denote like elements throughout this specification.

In this disclosure, an 'operating system (OS)' may refer, for example, to a system software for providing a common system service with a hardware abstraction platform to execute programs in an electronic apparatus, as well as managing a system hardware. Also, the OS performs an arbitration role between the programs and a hardware of the electronic apparatus. In this specification as described below, the OS may be configured to be stored in a storage, and executed by at least one processor to determine whether a program has an access authority to a virtual device if attempting an access thereto and thus to permit or deny the access of the program.

In this disclosure, a 'host execution environment' may refer, for example, to a main or regular system of the electronic apparatus, which is executed by the OS.

In this disclosure, a 'virtual device' as a virtual execution environment generated by abstracting resources of the electronic apparatus at the host execution environment means a program execution environment, which is physically located in the electronic apparatus, but logically separated from the host execution environment of the electronic apparatus. Types of the virtual device may include AMD-V, application program abstraction, virtual machine, emulation, quick emulator (QEMU), hypervisor, container, nano-kernel, OS virtualization, X86 virtualization, desktop virtualization, etc.

FIG. 1 is a diagram illustrating an example of using an electronic apparatus and a virtual device according to an example embodiment.

The electronic apparatus 1 according to an example embodiment may generate at least one virtual device, for example, a plurality of devices 100a, 100b and 100c, according to usage. The electronic apparatus 1 may be implemented as various electronic apparatuses, which include a smart terminal such as a smart phone, a tablet personal computer (PC) or the like, a computing device, such as a desktop PC, a laptop computer or the like, a personal digital assistant (PDA), a smart watch, a smart goggle, a head-mounted display (HMD), a television (TV), a set-top box, or the like, but is not limited thereto. The electronic apparatus 1 is configured to generate the virtual devices 100a, 100b and 100c therein to perform interactions with a plurality of external electronic apparatus 2a to 2e. The virtual devices 100a, 100b and 100c are configured to communicate with the corresponding external electronic apparatuses 2a to 2e via a communicator (e.g., including communication circuitry) of the electronic apparatus 1.

A virtualization technology may refer, for example, to a technology, which enables physical computer resources to logically divide (or combine) to efficiently use system resources. The virtual devices 100a, 100b and 100c may mean any one from among another virtual computer, virtual server, virtual desktop PC and virtual storage, which are software-configured and generated at the regular system. To make a virtual device 100 that a plurality of OSs runs on a real system hardware, the virtualization technology uses the same layer as the hypervisor or the container which includes only a binary and a library and which shares a kernel or OS of the regular system. The virtual devices 100a, 100b and 100c are isolated from one another, and configured, so that each virtual device 100a, 100b or 100c is not allowed to access an execution environment area of the regular system or other virtual device 100a, 100b or 100c.

As illustrated in FIG. 1, to perform a role of a hub device 100a of an internet of things (IOT) system, which connects the external electronic apparatuses 2a to 2c via a network, a role of a payment processing device 100b, which can communicate with an external payment server 2d at a payment system, and a role of a video on demand (VOD) device 100c, which performs various functions, such as communicating with a VOD server 2e to provide a VOD service and the like, the electronic apparatus 1 according to an example embodiment may be configured to generate the virtual devices 100a to 100c. Since the virtual devices 100a to 100c may perform various functions, they are not limited to performing such roles as illustrated in FIG. 1. For instance, virtual devices 100a to 100c according to another example embodiment may be generated to enable the electronic apparatus 1 to implement a virtual desktop PC, a virtual database, a virtual storage, etc.

As described above, the virtual devices 100a, 100b and 100c are generated to perform various roles, such as those in the hub device 100a of the IOT system, the payment processing device 100b, the VOD device 100c and the like. There is therefore more growing need for security enhancement when the virtual devices 100a, 100b and 100c perform such roles. For instance, if the regular system is ruined or taken over by an external hacking attack or the like to assign an administration authority to an external hacker or the like, a problem may occur in that the external hacker can arbitrarily control a CCTV 2b of user's house via the hub device 100a or take out and abuse security information for user's payment stored in the payment processing device 100b.

Accordingly, the electronic apparatus 1 according to an example embodiment may be configured to intermediate between a hardware and a software of the electronic apparatus 1, thereby to, when a program to which an administration authority is assigned from the OS which is foundational to operation of the regular system attempts to access the virtual devices 100a, 100b and 100c or data related thereto, determine whether the program has a separate access authority and to selectively permit or deny the access based on the determined access authority of the program.

Hereinafter, the electronic apparatus 1 according to an example embodiment will be explained in greater detail below with reference to the drawings.

Figure 2:
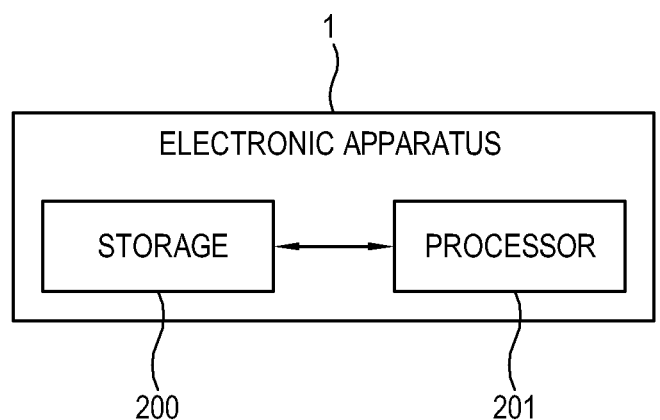
FIG. 2 is a block diagram illustrating an example electronic apparatus according to an example embodiment.

FIG. 2 is a block diagram illustrating an example electronic apparatus according to an example embodiment.

The electronic apparatus 1 may be configured to store a program therein, to, when the stored program attempts to access a virtual device 100 or data related thereto generated in the electronic apparatus 1, determine an access authority of the program, and to permit or deny the access based on the determined access authority of the program. To this end, the electronic apparatus 1 may include a storage 200 and at least one processor (e.g., including processing circuitry) 201.

The electronic apparatus 1 may be implemented as various electronic apparatuses, such as a smart phone, a tablet PC, a computing device, a laptop computer, a TV, a set-top box, or the like, but is not limited thereto, as described above. Thus, the electronic apparatus 1 may further include a display for providing information to a user, a user input receiver for receiving an input or command from the user, and a communicator (e.g., including communication circuitry) for communicating with external apparatuses.

The display is configured to display an image based on an image signal. The display may include a display panel on which the image is displayed, and a light source, such as a backlight unit, which supplies light to the display panel. The display may further include a driver which supply power to the display panel and the light source to drive the display panel and the light source. The display may be configured to, if the display panel is implemented as a non-light emitting element, supply the light from the light source to the display panel to display the image, and to, if the display panel is implemented as a self-light emitting element, directly supply the power to the display panel from a driving circuit. Also, the display may include a touch screen for directly receiving an input or command from the user. The electronic apparatus 1 may be configured to provide information about the virtual device 100 and a user interface (UI) for sending and receiving data to and from external electronic apparatuses connected through the virtual device 100, via the display.

Also, the electronic apparatus 1 may further include a speaker, which can output a voice or sound. The speaker may be provided in the electronic apparatus 1 or configured as an external device connected with the electronic apparatus 1 via s signal line.

The user input receiver may be configured to receive the user input or command via a mouse, a keyboard or the like. The user input receiver may directly receive a manipulation command via a manipulation panel, or receive a signal including a user manipulation command therein from a remote controller, a mouse, a keyboard or the like. Also, the user input receiver may be implemented in a form of a touch pad or by the touch screen which senses a user touch input on the display panel of the display, as described above.

The communicator may include various communication circuitry and is configured to communicate with the external electronic apparatuses. To be more specific, the communicator may be configured to enable the virtual device 100 to receive information from the external electronic apparatuses or transmit control signals to the external electronic apparatuses. To this end, the communicator is provided to be connectable with the external electronic apparatus, the network or the like. The communicator may include a plurality of connection ports according to various standards, such as high definition multimedia interface (HDMI), universal serial bus (USB), etc. The communicator may communicate by wired with a plurality of severs via wired local area network (LAN). Also, the communicator may communicate by wireless. To communicate by wireless, the communicator may include a radio frequency (RF) circuit to transmit and receive a RF signal. Also, the communicator may perform wireless communication through one or more wireless network selected from among wireless fidelity (Wi-Fi), Bluetooth (BT), Zigbee, ultra-wide band (UWM), wireless USB, and near field communication (NFC).

The communicator may further include an antenna for receiving an image signal from the outside, and a tuner, a demodulator and so on for processing the image signal received via the antenna to provide image information. The communicator may be configured to receive at least one signal selected from among a terrestrial signal, a satellite signal and a cable signal. Also, the communicator may receive a broadcasting signal via digital broadcasting systems, such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), etc. The received broadcasting signal is processed and provided to the display to display an image included therein. The display may be configured to display the image based the processed broadcasting signal.

The storage 200 may be configured to store various data to be used at the electronic apparatus 1. To be more specific, the storage 200 may be configured to store an OS, which performs the intermediation role between the hardware and the software of the electronic apparatus 1 to control a general operation of the electronic apparatus 1, a virtual device program, which performs functions related with the virtual device 100, such as generating, modifying, and sharing the virtual device 100, and at least one program, which performs other functions of the electronic apparatus 1.

The storage 200 may be provided with a nonvolatile memory, which can remain data even if the power supplied to the electronic apparatus 1 is shut off and which can write down data to store changed matter. That is, the storage 200 may be provided with any one of a flash memory and an erasable programmable read-only Memory (EPROM) or an electrically erasable programmable read-only Memory (EEPROM).

The processor 201 may include various processing circuitry and is configured to control the general operation of the electronic apparatus 1. The processor 201 according to an example embodiment may include at least one processor, each of which performs roles different from each other or duplicately performs same roles in part. In the drawing and description as described below, for the sake of explanation, one processor 201 is illustrated and explained, but not limited thereto.

The processor 201 is configured to execute the OS and also to execute the virtual device program to generate the virtual device 100. Also, if a program to which an administration authority is assigned from the OS from among at least one program accesses the virtual device 100 or data thereabout, the processor 201 may be configured to determine an access authority of the program via the OS and to selectively permit or deny the access of the program, which tries to access, based on the determined access authority of the program. The access authority may be determined based on an authentication code included in a source code of the program when the program is built. The access authority determination of the program and the permission and denial of the access are controlled by the OS and detailed explanation thereon will be described later.

The data about the virtual device 100 includes programs, such as a virtual device program capable of performing various functions related with the virtual device 100, at least one program separated to be logically included in the virtual device 100, and the like, which are stored in the form of files. The various functions related with the virtual device 100 may include generation of the virtual device 100, setting change of the generated virtual device 100, sharing of the virtual device 100 via the network, initialization of the virtual device 100, etc. Also, the data about the virtual device 100 may include a directory of the storage 200 in which the virtual device program or the program included in the virtual device 100 is located, and whole process information (for example, proc filesystem and the like) capable of discerning that the virtual device 100 is generated and in operation. The processor 201 according to an example embodiment may be configured to, if the program has the administration authority assigned from the OS, but does not have the access authority to the virtual device 100, deny an access to all data related with the virtual device 100 as described above.

As described above, the processor 201 may be configured to determine the access authority of the program trying to access the virtual device 10 by using the OS and to permit or deny the access based on the determined access authority of the program. However, if unauthenticated drivers are allowed to be loaded into the OS, logic may be changed in the OS due to such a loading of the unauthenticated drivers, thereby resulting in abnormal authority determination of the program and abnormal permission or denial of the access. Accordingly, the processor 201 according to an example embodiment may be configured to check whether drivers have been authenticated to load only authenticated drivers into the OS, if the drivers are included in the OS.

Alternatively, the processor 201 according to an example embodiment may be configured to monitor whether the OS is altered. Since if the OS has been altered, what the processor 201 determines the access authority by using the authentication code and permits or denies the access based on the determined access authority is no longer valid, it is need to monitor the alternation of the OS. Accordingly, the processor 201 may be configured to monitor whether the OS is altered and if it is determined that the OS has been altered, perform operations, such as blocking all accesses to the virtual device 100 to protect the virtual device 100, initializing or stopping the virtual device 100, and the like, thereby protecting programs and data in the virtual device 100.

Hereinafter, individual example embodiments of the electronic apparatus 1 will be explained with reference to drawings.

Figure 3:
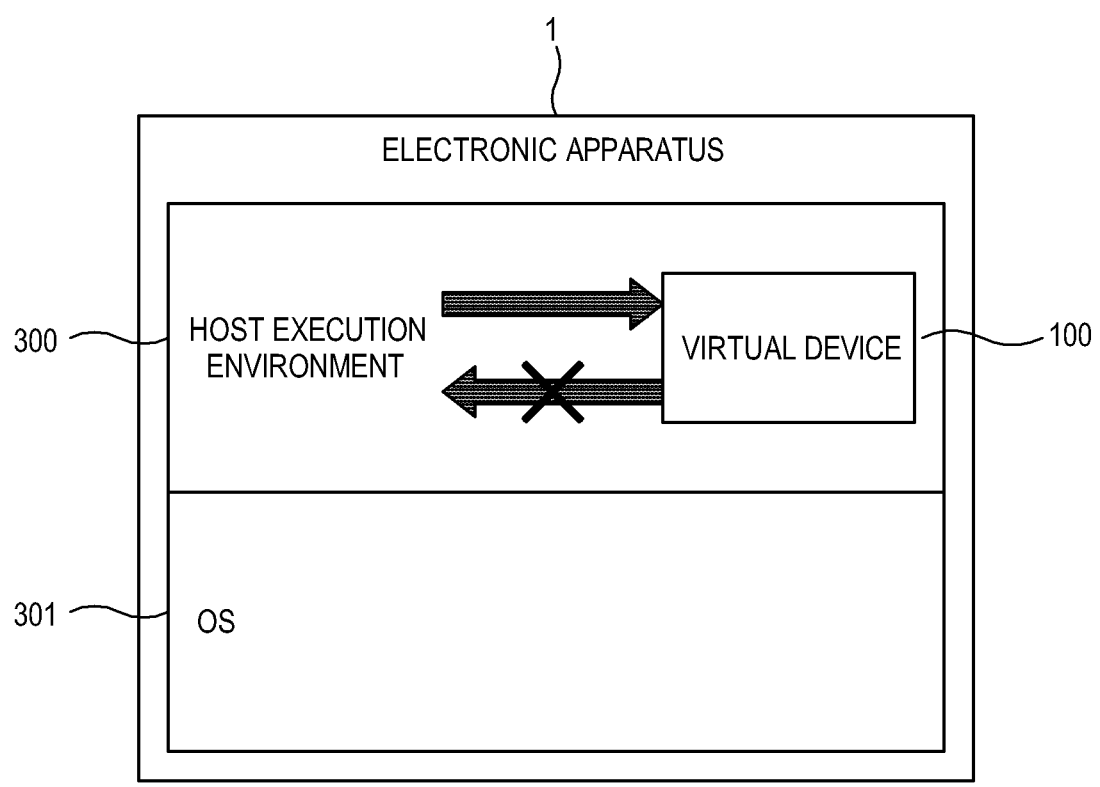
FIG. 3 is a diagram illustrating an example of an operation of an electronic apparatus according to an example embodiment.
Figure 4:
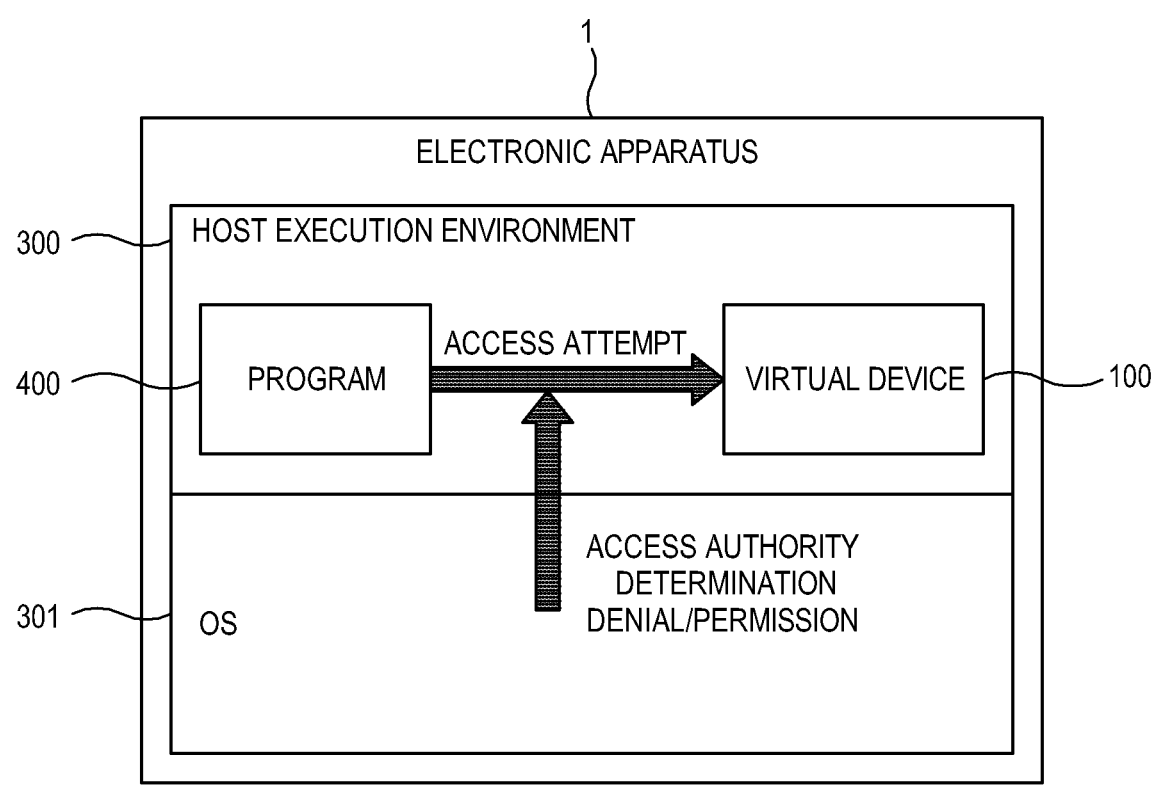
FIG. 4 is a diagram illustrating an example of another operation of an electronic apparatus according to an example embodiment.

FIGS. 3 and 4 are diagrams illustrating examples of an operation of an electronic apparatus according to an example embodiment.

Referring to FIG. 3, an OS 301, a host execution environment 300 according to a regular system of the electronic apparatus 1 based on the OS 301, and a virtual device 100 sharing the OS 301 of the electronic apparatus 1 with the host execution environment 300 are executed by the processor 201 of the electronic apparatus 1.

The OS 301 may, for example, be a program, which is stored in the storage 200 of the electronic apparatus 1 and executed by the processor 201 to perform a role of intermediating the general operation of the electronic apparatus 1, may include Window, Mac, Linux, BSD, Unix, etc. The host execution environment 300, which is executed by the OS 301, may refer, for example, to the regular system of the electronic apparatus 1. The virtual device 100, as a virtual execution environment generated by executing the virtual device program stored in the storage 200 by the processor 201 to abstract resources of the electronic apparatus 1 in the host execution environment 300, means a program execution environment, which is physically located in the electronic apparatus 1, but logically separated from the host execution environment 300 of the electronic apparatus 1.

According to an example embodiment, if a program or the like, which has an administration authority assigned by the OS 301 at the host execution environment 300 but does not have access authority, accesses a program included in the virtual device 100 or data which is an output according to execution of the program of the virtual device 100, the electronic apparatus 1 denies the access to protect the program and the data in the virtual device 100.

Referring to FIG. 4, an example of enabling the OS 301 to selectively permit or deny the access to the virtual device 100 to address the above described problem are illustrated.

If a first program 400 to which an administration authority is assigned by the OS 301 from among programs included in the host execution environment 300 attempts to access the virtual device 100, the OS 301 determines whether the first program 400 has an access authority to the virtual device 100. The access to the virtual device 100 includes an access to data about the virtual device 100, as well as an access to the virtual device 100, as described above. In order words, if the first program 400 refers to or access a program belonging to the virtual device 100, a virtual device program, or directories in which the respective programs are located, the OS 301 determines whether the first program 400 has the access authority thereto. The access authority to virtual device 100 may be determined according to whether an authentication code is included in a source code of the first program 400. When building the virtual device program and related programs, the authentication code may be incorporated in source codes of the programs and detailed explanation thereon will be described later.

The OS 301 is configured to permit the access if it is determined that the first program 400 has the access authority to the virtual device 100, and to deny the access if it is determined that the first program 400 does not have the access authority to the virtual device 100, even if it has the administration authority.

The OS 301 determines the access authority of the first program 400 to virtual device 100 based on the authentication code included in the source code of the first program 400. Thus, to explain the authentication code, an example of the source code of the first program 400 will be hereinafter explained with reference to the drawing.

Figure 5:
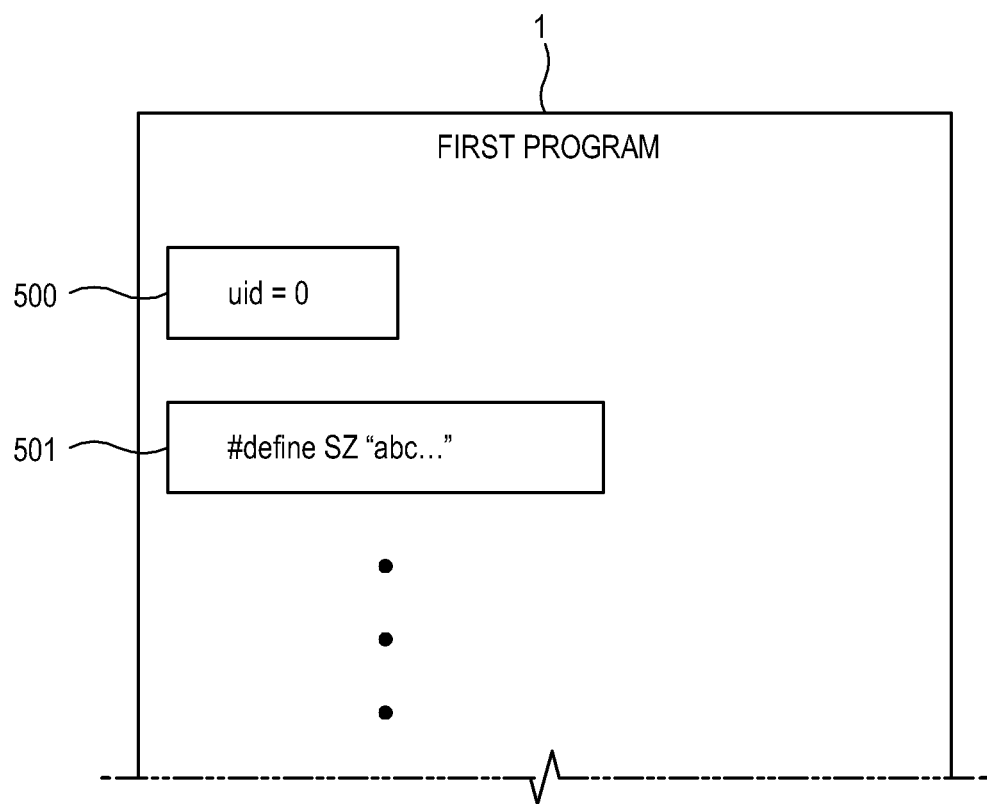
FIG. 5 is a diagram illustrating an example of a source code of a first program including an authentication code according to an example embodiment.

FIG. 5 is a diagram illustrating an example of a source code of a first program including an authentication code according to an example embodiment.

If the OS 301 is the Linux, an administration authority assigned from the OS 301 is determined according to a user ID (UID) assigned by the OS 301. In an example embodiment, a first program 400 to which an administration authority 500 is assigned from the OS 301 has a UID, which corresponds to 0. If the administration authority 500 is not assigned to the first program 400, the first program 400 has a UID, which is a number larger than 0. The example embodiment is merely an example, and the OS 301 is not limited to the Linux and may be configured to assign the administration authority 500 in various methods to the first program 400.

According to the above described example embodiment, even if the administration authority 500 is assigned to the first program 400, to permit the access of the first program 400 to the virtual device 100, the first program 400 has to include an authentication code 501 included in building thereof. The authentication code 501 may be included in a source code of the first program 400 selected to permit the access to the virtual device 100. The first program 400 to which the access to the virtual device 100 is permitted requires generating or modifying the virtual device 100 or referring to data or the like generated in the virtual device 100 to perform functions thereof, and an access authority to the virtual device 100 may be therefore assigned to the first program 400 when the first program 400 is in production. As illustrated in the diagram, the authentication code 501 may be incorporated in the source code of the first program 400 in process of building the first program 400. The authentication code 501 may be differently generated according to various criteria, such as a time at which the authentication code 501 is generated, a name of the first program 400 in which the authentication code 501 is included, a type of authority of which the first program 400 should have, etc. The OS 301 may be configured to determine whether the first program 400 has the access authority to the virtual device 100 or data related with the virtual device 100 with reference to the authentication code 501 of the first program 400.

Figure 6:
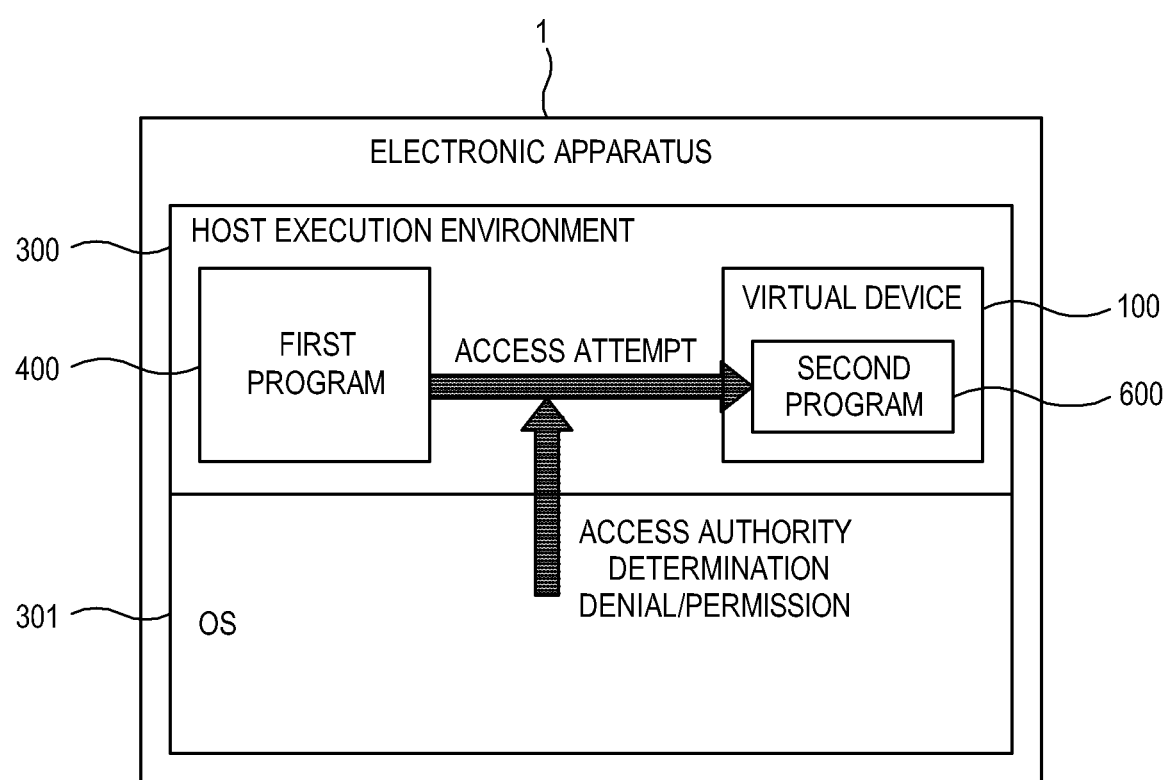
FIG. 6 is a diagram illustrating an example of an operation of an electronic apparatus, which selectively permits or denies an access to a virtual device or data about the virtual device according to an example embodiment.
Figure 7:
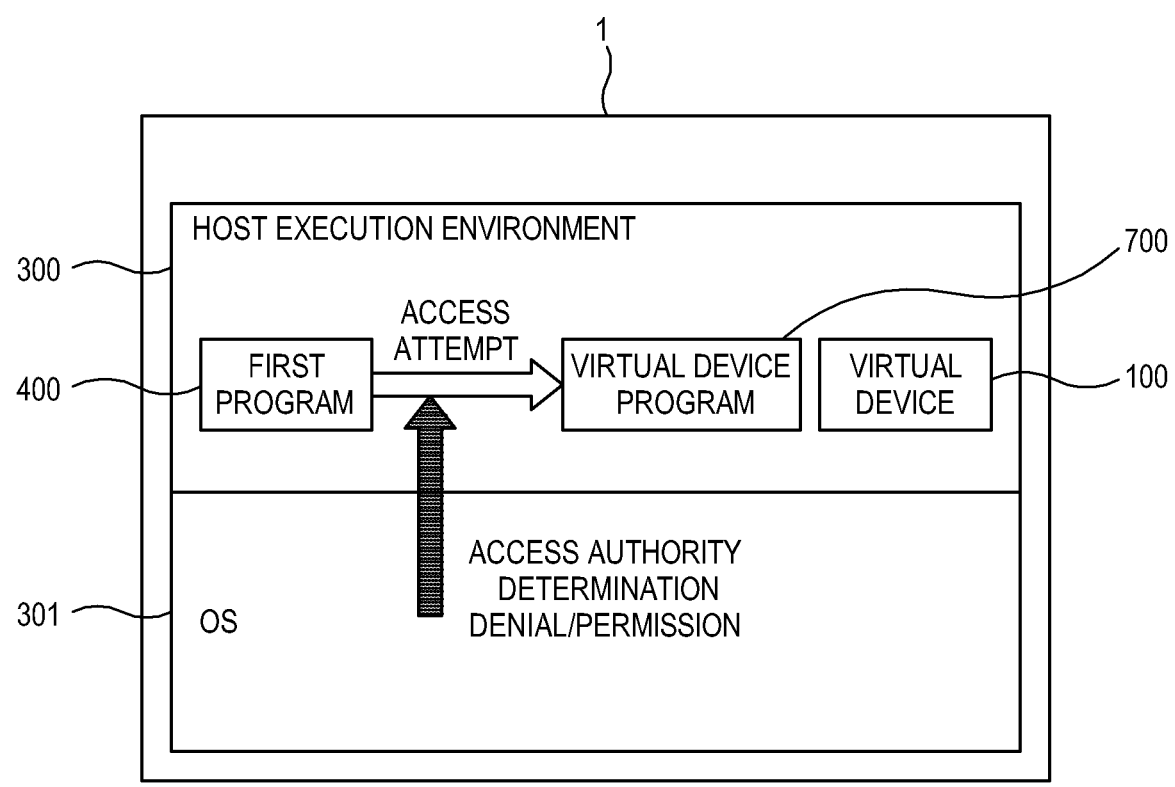
FIG. 7 is a diagram illustrating an example of another operation of an electronic apparatus, which selectively permits or denies an access to a virtual device or data about the virtual device according to an example embodiment.
Figure 8:
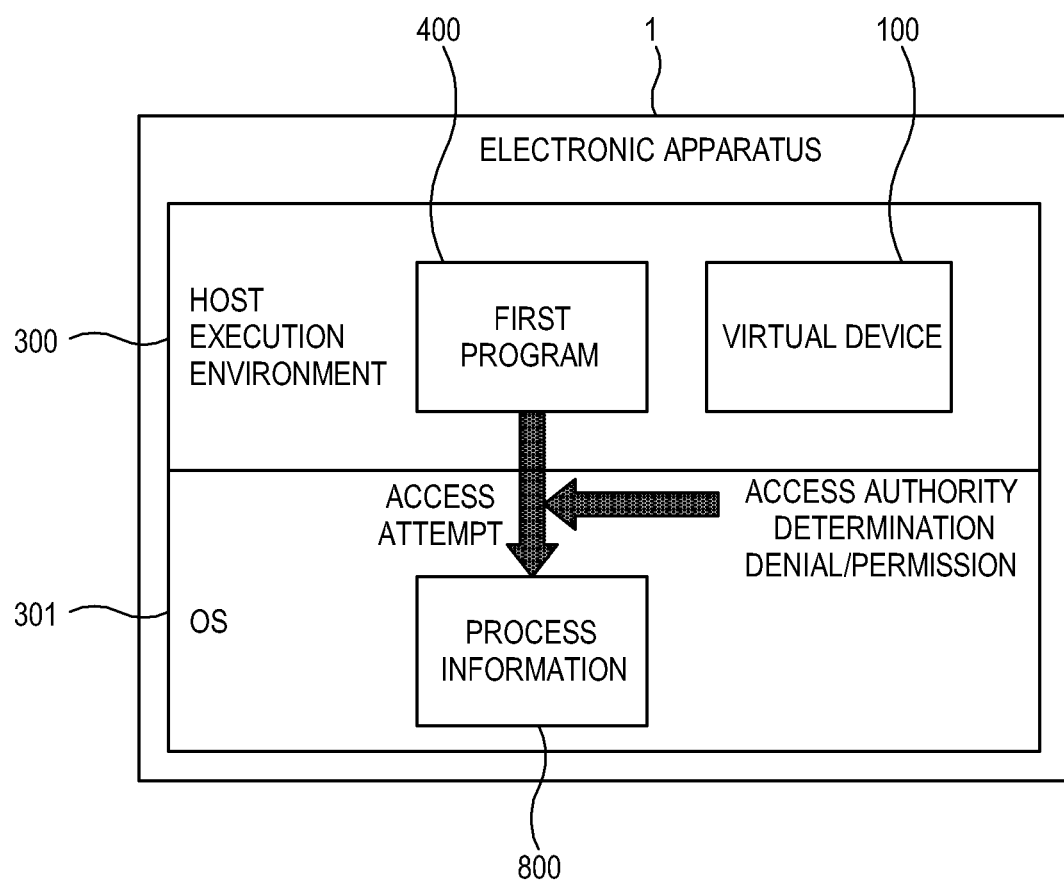
FIG. 8 is a diagram illustrating an example of other operation of an electronic apparatus, which selectively permits or denies an access to a virtual device or data about the virtual device according to an example embodiment.

FIGS. 6, 7 and 8 are diagrams illustrating examples of an operation of an electronic apparatus, which selectively permits or denies an access to a virtual device or data about the virtual device according to an example embodiment;

If the first program 400 which is included in the host execution environment 300 and to which the administration authority is assigned from the OS 301 attempts to access the virtual device 100 or data related with the virtual device 100, the OS 301 may be configured to determine whether the first program 400 has an access authority to the virtual device 100 to selectively permit or deny the access.

The access authority may include authority over access to process information 800 (FIG. 8) within the electronic apparatus 1, which can discern that a second program 600 (FIG. 6), to a virtual device program 700 (FIG. 7) and the virtual device 100 are in operation, as well as that operations related with the virtual device 100, such as generating the virtual device 100, modifying the virtual device 100 and the like, are performed, and to the virtual device 100 itself, such as referring to the virtual device 100 and the like.

Referring to FIG. 6, an example of, if the first program 400 attempts to access the second program 600 included in the virtual device 100, determining whether the first program 400 has an access authority to permit or deny the access, by the OS 301 is illustrated.

The second program 600 includes an application for performing a specific function, data including information, and the like, which are included and separated in the virtual device 100. The first program 600 may be configured to attempt an access to the second program 600 of the virtual device 100 in order to use or refer to the second program 600, and the OS 301 may be configured to determine whether the first program 400 has the access authority to the virtual device 100 and to permit or deny the access based on the determination.

Referring to FIG. 7, an example of, if the first program 400 attempts to access the virtual device program 700, determining whether the first program 400 has an access authority to permit or deny the access, by the OS 301 is illustrated.

The virtual device program 700 may refer, for example, to a program, which performs functions related with the virtual device 100, such as generating the virtual device 100, modifying the virtual device 100, stopping the virtual device 100, and the like, at the host execution environment 300. Although the virtual device program 700 does not belong to the virtual device 100 or the second program 600 in the virtual device 100, but belongs to the host execution environment 300, the access permission of the first program 400 to the virtual device program 700 enables the first program 400 to control the virtual device 100, like the access permission of the first program 400 to the virtual device 100. Thus, it is necessary to check whether the first program 400 has the access authority to the virtual device program 700. The OS 301 may be configured to, if the first program 400 attempts to access the virtual device program 700, determine whether the first program 400 has the access authority to the virtual device program 700 and to permit or deny the access of the first program 400 based on the determination.

According to another example embodiment, the OS 301 may be configured to permit or deny an access of the first program 400 to a directory or folder, which is divided in a storage 200 to belong to the second program 600 included in the virtual device 100 or the virtual device program 700, as well as an access of the first program 400 to the second program 600 or the virtual device program 700, based on the access authority to the virtual device 100. This access, which is not direct access, but indirect access to the file or data, is also blocked in advance.

Referring to FIG. 8, an example of, if the first program 400 attempts to access a process information 800 of the OS 301, determining whether the first program 400 has an access authority to permit or deny the access, by the OS 301 is illustrated.

The process information 800 includes any one of a task manager and a proc filesystem according to OS 301. The first program 400 may refer to the process information 800 to access information for all processes, which are executed in the electronic apparatus 1. Here, all processes include information for the virtual device 100 executed in the host execution environment 300. The OS 301 may be configured to, if the first program 400 attempts to access the process information 800, determine whether the first program 400 has an access authority to the virtual device 100, to deny an access to the process information 800 or permit an access to the remainder of the process information 800 other than processes related with the virtual device 100.

Figure 9:
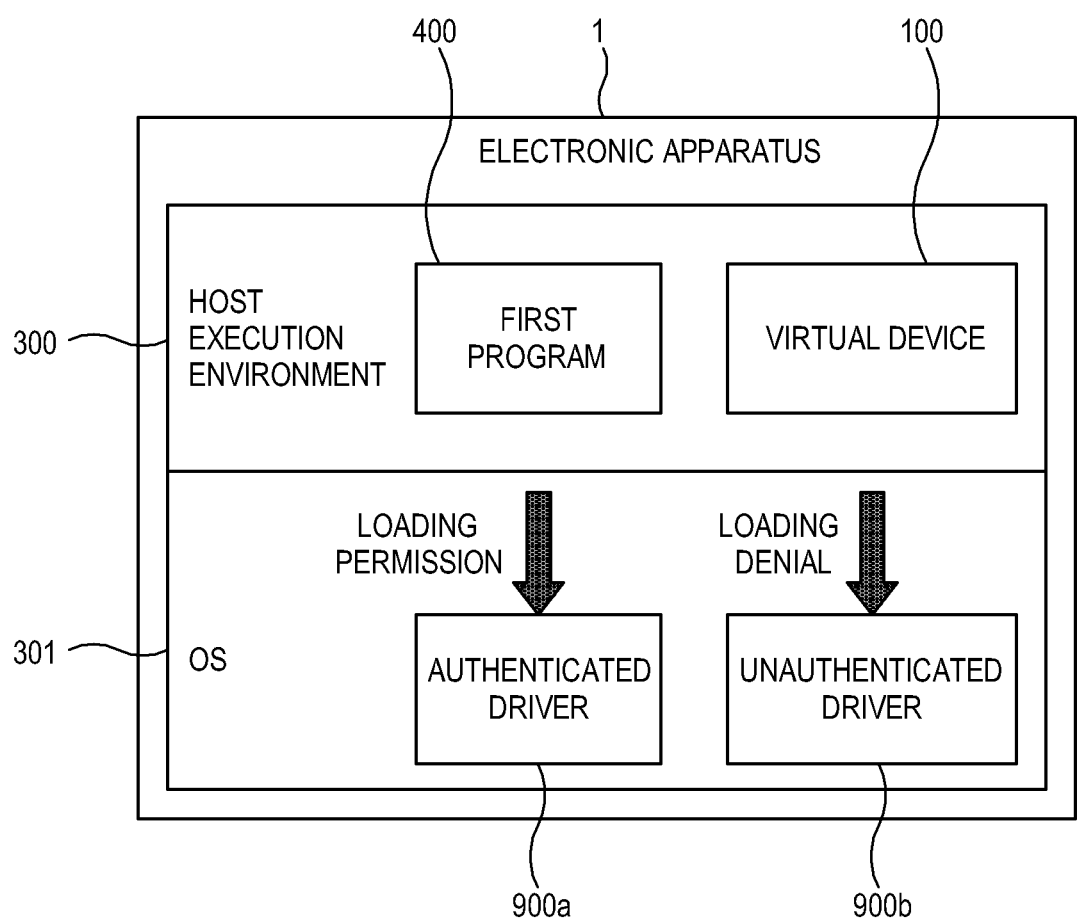
FIG. 9 is a diagram illustrating an example of an operation of an electronic apparatus, which blocks unauthenticated drivers from being loaded according to an example embodiment.

FIG. 9 is a diagram illustrating an example of an operation of an electronic apparatus, which blocks unauthenticated drivers from being loaded according to an example embodiment.

The electronic apparatus 1 may further include at least one driver, for example, a plurality of drivers 900a and 900b. The drivers 900a and 900b as software for controlling the electronic apparatus 1 or peripherals connected thereto are illustrated as being included in the OS 301, but may be configured separate from the OS 301. The drivers 900a and 900b according to an example embodiment are assumed and described as OS drivers 900a and 900b which comprise a portion of the OS 301. The OS drivers 900a and 900b may include a kernel loadable module, a kernel extension, a kernel mode driver, etc. The OS drivers 900a and 900b may be used to add a support of new hardware or file system, or a system call. Accordingly, if an unauthenticated driver 900b is loaded in the OS 301, a problem may occur in that internal logic of the OS 301 is changed. Also, if an access to the virtual device 100 or data related therewith is detected, the OS 301 functions to determine an access authority of the first program 400 attempting to access the virtual device 100 and to permit or deny the access of the first program 400 based on the determined access authority. However, if the logic of the OS 301 is changed due to the loading of the unauthenticated driver 900b, such as a rootkit or the like, in the OS 301, a problem may occur in that the OS 301 cannot block the access to the virtual device 100 by the first program 400 which does not have the access authority.

Accordingly, to address the above described problem, the processor 201 according to an example embodiment may be configured to enable the OS 301 to load only an authenticated driver 900a therein and to block an unauthenticated driver 900b from being loaded therein.

Figure 10:
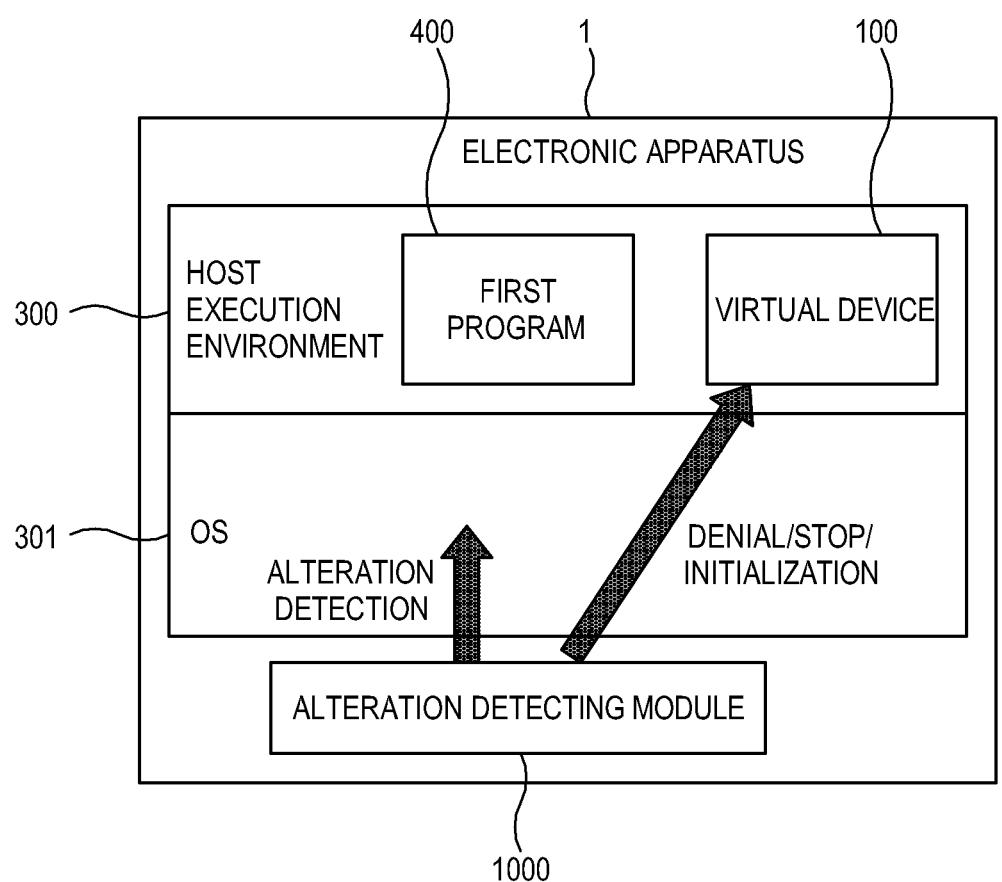
FIG. 10 is a diagram illustrating an example of an operation of an electronic apparatus, which monitors whether an operation system (OS) is altered according to an example embodiment.

FIG. 10 is a diagram illustrating an example of an operation of an electronic apparatus, which monitors whether an OS is altered according to an example embodiment.

As described above, the OS 301 is configured to determine whether the first program 400 of the host execution environment 300 has an authority to access the virtual device 100 and to selectively permit or deny the access to the virtual device 100 or data related therewith based on the determination.

The OS 301 may be configured to determine the access authority of the first program 400 to the virtual device 100 based on an authentication code included in the first program 400 in building of the first program 400. However, if the OS 301 is altered, a function by which the OS 301 determines the access authority of the first program 400 to the virtual device 100 based on the authentication code of the first program 400 may be invalid. In other words, a problem may occur in that the OS 301 altered due to an external hacking attack or the like does not determine the authentication code of the first program 400, or determine that the first program 400 always includes the authentication code, thereby permitting the access of the first program 400 to the virtual 100 or the data related therewith.

Accordingly, to address the above described problem, the processor 201 according to an example embodiment may further include an alteration detecting module 1000. The alteration detecting module 1000 may continue to detect whether the OS 301 is altered, and if it is determined that the 301 has been altered, to deny all accesses to the virtual device 100 to stop or suspend an operation of generated virtual device 100, or to initialize data of the virtual device 100, without determining a presence of the access authority in order to protect the virtual device 100.

Figure 11:
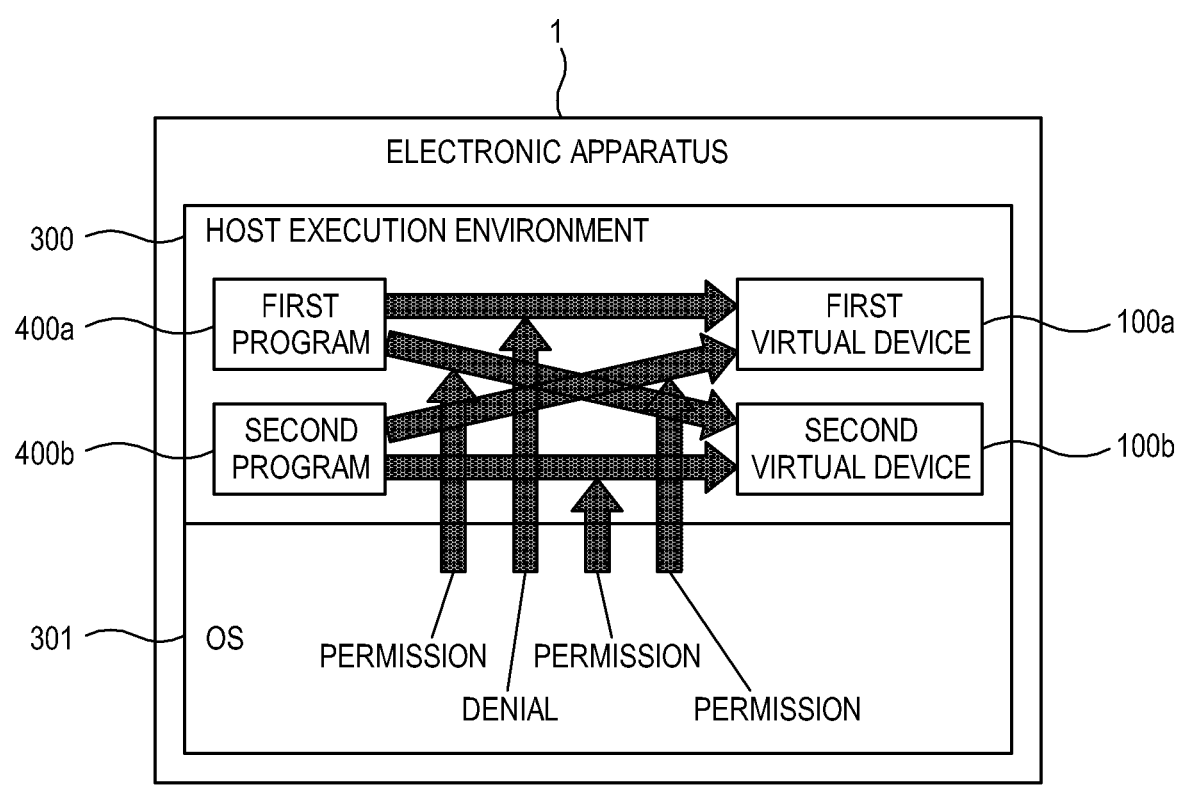
FIG. 11 is a diagram illustrating an example of an operation of an electronic apparatus, which permits an access only to at least a portion from among a plurality of virtual devices based on an access authority of a program according to an example embodiment.

FIG. 11 is a diagram illustrating an example of an operation of an electronic apparatus, which permits an access only to at least a portion from among a plurality of virtual devices based on an access authority of a program according to an example embodiment.

The host execution environment 300 of the electronic apparatus 1 may include a plurality of programs 400*a* and 400*b* to which an administration authority is assigned from the OS 301, and a plurality of virtual devices 100*a*, 100*b*. Each program 400*a* or 400*b* may attempt to access at least one virtual device from among the plurality of virtual devices 100*a*, 100*b*. The OS 301 may be configured to determine an access authority of each program 400*a* or 400*b* to the virtual devices 100 based on an authentication code of each program 400*a* or 400*b*. The authentication code included in a source code of each program 400*a* or 400*b* may include information to enable each program 400*a* or 400*b* to access only a portion from among the plurality of virtual devices 100.

Referring to FIG. 11, an example of which the OS 301 denies an access of a first program 400*a* to the first virtual device 100*a*, but permits an access of the first program 400*a* to a second virtual device 100*b* and an access of a second program 400*b* to all the virtual devices 100*a* and 100*b* is illustrated. The first program 400*a* and a second program 400*b* of FIG. 11 are for identifying the plurality of programs 400*a* and 400*b* belonging to the host execution environment 300, and in particular the second program 400*b* is different from the second program 600 belonging to the virtual device 100 of FIG. 6.

The authentication codes included in source codes of the first and the second programs 400*a* and 400*b* may function to assign to corresponding program 400*a* or 400*b*, an access authority to access only a specific virtual device 100, not to access only the specific virtual device 100, or to access all the virtual devices 100. The OS 301 may be configured to analyze the authentication codes to determine the access authorities of the first and the second programs 400*a* and 400*b*, and to selectively permit or deny accesses of the first and the second programs 400*a* and 400*b* to the virtual devices 100 or data related therewith based on the determination.

Figure 12:
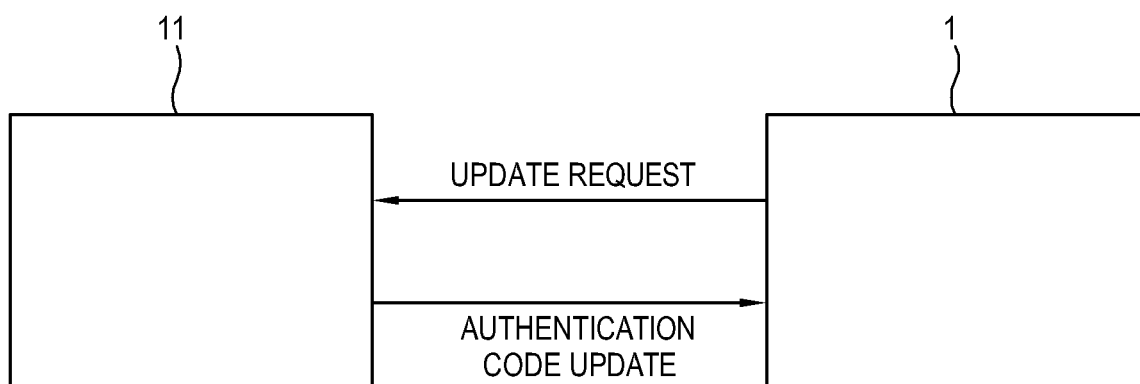
FIG. 12 is a diagram illustrating an example of a security upgrade operation between a server and an electronic apparatus according to an example embodiment.

FIG. 12 is a diagram illustrating an example of a security upgrade operation between a server and an electronic apparatus according to an example embodiment.

Referring again to FIG. 5, a portion of the source code of the first program 400, which includes the authentication code 501, is illustrated. As described above, the authentication code 501 may be included in the first program 400 during building of the first program 400 in process of manufacturing the electronic apparatus 1.

To update the authentication code 501 of the first program 400, the electronic apparatus 1 may request a server 11 for an update of the authentication code 501 via the communicator. The update of the authentication code 501 may be periodically performed as time passed, or performed according to a selection of user or to increase security if an external intrusion is detected. The electronic apparatus 1 may provide a user interface (UI), which includes menu items related to the update request. The user may use the UI to change related settings, such as an update period for authentication code and the like, or to manipulate the electronic apparatus 1 to directly transmit an update request for the authentication code 501 to the server 11.

The server 11 may be configured to transmit a first program 400 in which the authentication code 501 is updated, to the electronic apparatus 1 If receiving the update request for the authentication code 501, and the electronic apparatus 1 may be configured to replace the existing first program 400 with the updated first program 400.

According another example embodiment, the server may be configured to periodically transmit the first program 400 in which the authentication code 501 and functions are updated, to a plurality of electronic apparatuses 1 even without receiving the update request from the electronic apparatuses 1.

FIG. 13 is a flowchart illustrating an example control method of an electronic apparatus according to an example embodiment.

First, at operation 51200, an OS 301, a virtual device program 700, and at least one program 400 are stored in the storage 200. At operation 51201, the processor 201 executes the virtual device program 700 to generate a virtual device 100. At operation 51202, if a first program 400 having an administration authority assigned from the OS 301 attempts to access the virtual device 100 or data related thereto, at operation 51203, the OS 301 determines whether the first program 400 attempting to access the virtual device 100 or data related thereto has an access authority to the virtual device 100. If it is determined that the first program 400 has the access authority, at operation 51204, the OS 301 permits the access of the first program 400. If it is determined that the first program 400 does not have the access authority, at operation 51205, the OS 301 denies the access of the first program 400.

While various example embodiments have been illustrated and described, it will be understood by those skilled in the art that various changes in form and details may be made therein without departing from the spirit and scope of the present disclosure as defined by the appended claims and their equivalents.

What is claimed is:

1. An electronic apparatus configured to be operated in a host execution environment based on an operating system (OS), comprising:
   a storage configured to store the OS, a virtual device program capable of generating a virtual device executed based on the OS, and a plurality of programs; and a processor configured to:
  execute the virtual device program to generate the virtual device; and
  based on an attempt to access data about the virtual device by a first program among the plurality of programs, determine whether the first program has an administration authority assigned by the OS in the host execution environment;
  based on the determination that the first program has the administration authority, cause the OS to identify whether the first program comprises an authentication code which indicates that the first program is authorized to access the data about the generated virtual device; and
  based on the authentication code being identified to be comprised in the first program, permit access to the data about the virtual device.

2. The apparatus according to claim 1, wherein the data about the virtual device comprises at least one of: the virtual device program, a second program executed at the virtual device from among the plurality of programs, a directory in which the virtual device program or the second program is located, and process information of the electronic apparatus.

3. The apparatus according to claim 1, wherein the authentication code is included in building of the first program.

4. The apparatus according to claim 1, wherein the processor is configured to monitor whether the OS is altered, and based on the OS being identified to be altered, to perform at least one of: denying all accesses to the data about the virtual device, stopping the generated virtual device, and initializing the generated virtual device.

5. The apparatus according to claim 1, wherein the processor is configured to identify whether drivers included in the OS have been authenticated, and to block unauthenticated drivers from being loaded.

6. The apparatus according to claim 1, wherein the processor is configured to execute the virtual device program to generate a plurality of virtual devices, and to selectively permit access to at least one virtual device from among the plurality of virtual devices based on the authentication code being identified to be comprised in the first program.

7. The apparatus according to claim 1, wherein the storage is configured to store the virtual device program, the virtual device program being capable of generating a plurality of virtual devices that are executable based on the OS, wherein each of the virtual devices is isolated from one another and configured so that each virtual device is not allowed to access the host execution environment and not allowed to access any of the other virtual devices.

8. The apparatus according to claim 1, wherein the OS is configured to identify whether the first program has access authority to the data about the virtual device with reference to the authentication code of the first program.

9. A method of operating an electronic apparatus operated in a host execution environment based on an operating system (OS), comprising:
  storing the OS, a virtual device program capable of generating a virtual device executed based on the OS, and a plurality of programs;
  executing the virtual device program to generate the virtual device; and
  based on an attempt to access data about the virtual device by a first program among the plurality of programs, determining whether the first program has an administration authority assigned by the OS in the host execution environment;
  based on the determination that the first program has the administration authority, causing the OS to identify whether the first program comprises an authentication code which indicates that the first program is authorized to access the data about the generated virtual device; and
  permitting access to the data about the virtual device based on the authentication code being identified to be comprised in the first program.

10. The method according to claim 9, wherein the data about the virtual device comprises at least one of: the virtual device program, a second program executed at the virtual device from among the plurality of programs, a directory in which the virtual device program or the second program is located, and process information of the electronic apparatus.

11. The method according to claim 8, wherein the authentication code is included in building of the first program.

12. The method according to claim 8, further comprising:
  monitoring whether the OS is altered; and
  based on the OS being identified to be altered, performing at least one of: denying all accesses to the data about the virtual device, stopping the generated virtual device, and initializing the generated virtual device.

13. The method according to claim 8, further comprising:
  identifying whether drivers included in the OS have been authenticated; and
  blocking unauthenticated drivers from being loaded.

14. The method according to claim 8, further comprising:
  generating a plurality of virtual devices; and
  selectively permitting access to at least one virtual device from among the plurality of virtual devices based on the authentication code being identified to be comprised in the first program.

* * * * *